(12) United States Patent
Himeno

(10) Patent No.: US 7,060,807 B2
(45) Date of Patent: Jun. 13, 2006

(54) AOX-FREE NAVY AND BLACK DISPERSE DYES

(75) Inventor: Kiyoshi Himeno, Fukuoka (JP)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 10/947,031

(22) Filed: Sep. 22, 2004

(65) Prior Publication Data

US 2005/0070648 A1  Mar. 31, 2005

Related U.S. Application Data

(60) Provisional application No. 60/505,773, filed on Sep. 25, 2003.

(51) Int. Cl.
C09B 29/085 (2006.01)
C09B 67/22 (2006.01)
C09B 67/00 (2006.01)
D06P 1/18 (2006.01)

(52) U.S. Cl. .............. 534/854; 534/850; 534/855; 8/532; 8/533; 8/639; 8/693; 8/696

(58) Field of Classification Search ............... 534/850, 534/854, 855; 8/532, 533, 639, 693, 696
See application file for complete search history.

(56) References Cited

U.S. PATENT DOCUMENTS 3,122,410 A * 2/1964 Mueller et al. ............... 8/524
3,250,763 A * 5/1966 Gies et al. ............... 534/850
3,342,803 A * 9/1967 Artz et al. ............... 534/855
5,910,624 A   6/1999 Wanken et al.

FOREIGN PATENT DOCUMENTS

| DE | 26 23 251 | 12/1976 |
| DE | 30 04 655 | 8/1981 |
| EP | 0 827 988 | 3/1998 |
| GB | 962468 | 3/1964 |
| GB | 1008176 | 10/1965 |
| GB | 1037164 | 7/1966 |
| GB | 2030169 | 4/1980 |
| JP | 51-150530 | 12/1976 |
| JP | 58-38754 | 3/1983 |

* cited by examiner

*Primary Examiner*—Fiona T. Powers
(74) *Attorney, Agent, or Firm*—Connolly Bove Lodge & Hutz

(57) ABSTRACT

Monoazo dyestuffs of the general formula (1)

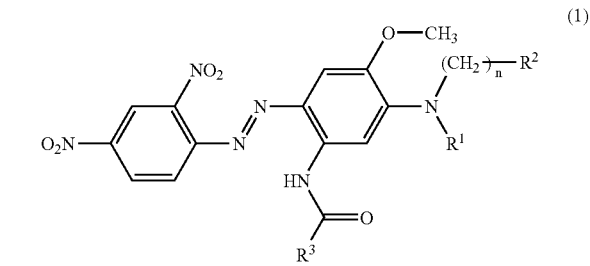

wherein $R^1$, $R^2$, $R^3$ and n are as defined in claim 1, method for their preparation and a method for colouring a synthetic textile material or fiber blend thereof using such dyestuffs.

9 Claims, No Drawings

AOX-FREE NAVY AND BLACK DISPERSE DYES

RELATED APPLICATIONS

This application claims benefit to provisional application Ser. No. 60/505,773, filed Sep. 25, 2003.

This invention relates to disperse azo dyes.

Disperse AOX-free dyes are of growing interest due to ecological reasons. Disperse AOX-free disperse dyestuffs and their use for dyeing polyester and its blends with other fibers such as cellulose, elastane, nylon and wool by normal exhaust dyeing, continuous dyeing and direct printing techniques are already known for example from the documents DE 30 04 655, EP 827 988 or DE 26 23 251. However, they have certain application defects, such as for example relatively poor levelling/migration properties, an overly large dependence of the colour yield on varying dyeing parameters in the dyeing process or an insufficient colour build-up on polyester (good colour build-up results from the ability of a dye to provide a proportionally stronger dyeing when used in higher concentrations in the dye bath), or unsatisfactory fastness properties.

Thus there is a need for disperse dyes which provide dyeings of improved fastness properties, i.e. wash and light fastness properties of dyed polyester or its blends with other fibers such as cellulose, elastane, nylon and wool being free of halogen substituents due to ecological reasons.

The present invention, then, provides AOX-free disperse navy monoazo dyes which produce good levelling property and small dependence of colour yield on varying parameters in dyeing process and provide dyeings of very good wet and light fastness properties on synthetic textile material or its blends with other fibers.

The invention accordingly provides dyestuffs of the herein below indicated and defined formula (I)

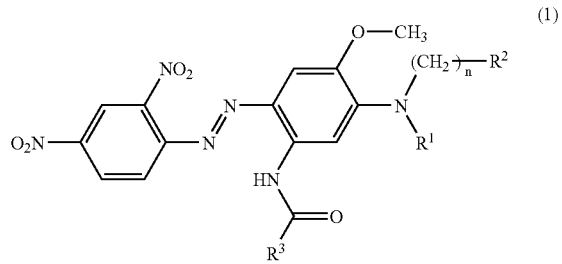

wherein
R$^1$ is hydrogen or C$_1$ to C$_4$-Alkyl
R$^2$ is hydrogen, C$_1$ to C$_4$-alkyloxycarbonyl, C$_1$ to C$_4$-alkylcarbonyloxy or cyano
R$^3$ is methyl or ethyl
n is 3 or 4 or is 0 if R$^2$ is hydrogen,
under the proviso that R$^1$ is not hydrogen if R$^2$ is hydrogen.

Alkyl R$^1$ may be straight-chain or branched and is in particular C$_1$–C$_4$–, such as methyl, ethyl n-propyl, isopropyol, n-butyl, isobutyl, sec-butyl or tert-butyl. Ethyl and n-propyl are preferred. Alkoxycarbony for R$^2$ may be linear or branched alkoxycarbonyl, such as methoxycarbonyl, ethoxycarbonyl, n-propoxycarbonyl, i-propoxycarbonyl, n-butoxycarbonyl or i-butoxycarbonyl, and C$_1$–C$_4$-alkylcarbonyl-oxy may be linear or branched, such as acetyoxy, ethylcarbonyloxy. n-propyl-carbonyloxy, i-propylcarbonyloxy, n-butylcarbonyloxy or i-butylcarbonyloxy. Among C$_1$–C$_4$ alkyoxycarbonyl and C$_1$–C$_4$ alkylcarbonyloxy, C$_1$ and C$_2$ are preferred. n is preferably 3.

Monoazo dyes of formula (1) are prepared, for example, by diazotization of dinitroaniline according to a conventional method, followed by coupling with an aniline of the following formula (2):

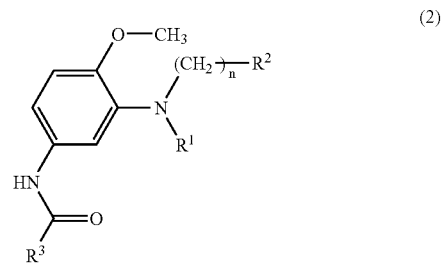

where R$^1$, R$^2$, R$^3$ and n are as defined above.

The synthetic textile material may be selected from aromatic polyester, especially polyethylene terephthalate, polyamide, especially polyhexamethylene adipamide, secondary cellulose acetate, cellulose triacetate, and natural textile materials, especially cellulosic materials and wool. An especially preferred textile material is an aromatic polyester or fibre blend thereof with fibers of any of the above mentioned textile materials. Especially preferred fibre blends include those of polyester-cellulose, such as polyester-cotton, and polyester-wool. The textile materials or blends thereof may be in the form of filaments, loose fibers, yarn or woven or knitted fabrics.

Particularly, among polyester fibers, not only ordinary polyester fibers (regular denier fibers) but also microfibres (fine denier fibers, which are less than 0.6 denier) may be mentioned as fibers which can successfully be dyed with the monoazo dye of this present invention.

When the monoazo dye of the present invention is used in dyeing, the monoazo dye of the formula (1) is dispersed in an aqueous medium by means of a dispersing agent and wetting agent in the usual way to prepare a dye bath for dyeing or a printing paste for textile printing.

Typical examples of dispersing agent are lignosulphonates, naphthalene sulphonic acid/formaldehyde condensates and phenol/cresol/sulphanilic acid/formaldehyde condensates, typical examples of wetting agent are alkyl aryl ethoxylates which may be sulphonated or phosphated and typical example of other ingredients which may be present are inorganic salts, de-foamers such as mineral oil or nonanol, organic liquids and buffers. Dispersing agents may be present at from 10% to 200% on the weight of the dyestuff. Wetting agents may be used at from 0% to 20% on the weight of the dyestuff.

For example, in the case of dyeing, polyester fibers and fibre mixture products such as blended yarn fabrics of union cloth product comprising polyester fibers can be dyed with good colour fastness by common dyeing methods, such as a high temperature dyeing method, a carrier dyeing method and a thermosol dyeing method. In the some case, the addition of an acid substance to the dye bath may result in more successful dyeing.

Suitable process conditions may be selected from the following (i) exhaust dyeing at a pH of from 4 to 8.5, at a temperature of from 125° C. to 140° C. for from 10 to 120 minutes and under a pressure of from 1 to 2 bar, a sequestrant optionally being added;
(ii) continuous dyeing at a pH of from 4 to 8.5, at a temperature of from 190° C. to 225° C. for from 15 seconds to 5 minutes, a migration inhibitor optionally being added;
(iii) direct printing at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 120° C. to 140° C. and 1 to 2 bar for from 10 to 45 minutes for pressure steaming, wetting agents and thickeners (such as alginates) of from 5 to 100% by weight of the dye optionally being added;
(iv) discharge printing (by padding the dye on to the textile material, drying and overprinting) at a pH of from 4 to 6.5, migration inhibitors and thickeners optionally being added;
(v) carrier dyeing at a pH of from 4 to 7.5, at a temperature of from 95° C. to 100° C. using a carrier such as methylnaphthalene, diphenylamine or 2-phenylphenol, sequestrants optionally being added; and
(vi) atmospheric dyeing of acetate, triacetate and nylon at a pH of from 4 to 7.5, at a temperature of 85° C. for acetate or at a temperature of 90° C. for triacetate and nylon for from 15 to 90 minutes, sequestrants optionally being added.

In all the above processes, the dyestuff is applied as a dispersion comprising from 0.001% to 20%, preferably from 0.005 to 1 6%, of the dye mixture in an aqueous medium.

In addition to the above-mentioned application processes, the dyestuff may be applied to synthetic textile materials and fibre blends by ink-jet printing, the substrates optionally having been pre-treated to aid printing. For ink-jet applications, the application medium may comprise water and a water-soluble organic solvent, preferably in a weight ratio of 1:99 to 99:1, more preferably 1:95 to 50:50 and especially in the range 10:90 to 40:60. The water-soluble organic solvent preferably comprises a $C_1$–$C_4$-alkanol, especially methanol or ethanol, a ketone, especially acetone or methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether, especially ethylene glycol monomethyl ether, propylene glycol monomethyl ether or diethylene glycol monomethyl ether, urea, a sulphone, especially bis-(2-hydroxyethyl) sulphone or mixtures thereof.

The dyestuff may also be applied to textile materials using supercritical carbon dioxide, in which case the dye formulating agents may optionally be omitted.

Dyeing products obtained by dyeing or textile printing with the monoazo dyestuff of the present invention are excellent in not only colour fastness to washing, light fastness and sublimation fastness, but also levelling and build-up property.

Embodiments of the present invention will now be described in more detail with reference to the following examples, in which parts are by weight unless otherwise stated.

Further, particularly the dyeing properties of the monoazo dye of this present invention are compared with the known dye mentioned in Japanese patent application 58038754 and Japanese patent application 51150530 in which include the similar chemicals in the comparative Example.

EXAMPLE 1

33.5 g of 40% of nitrosylsulfuric acid was added to the mixture of 18.3 g of 2,4-dinitroaniline and 40 g of 98% sulfuric acid between 20–25° C. and kept 3 hr at the temperature. Then the resulting diazo solution was added to a solution of 32.2 g of 2-methoxy-5-acetylamino-N-γ-ethoxycarbonylpropyl-N-ethylaniline in 100 ml of methanol and 500 g iced water at 0° C. and the mixture was stirred for 3 hr at 0° C.

The reaction mixture was neutralized by 25% sodium hydroxide at 0° C. before filtration.

The precipitated dye of formula (3):

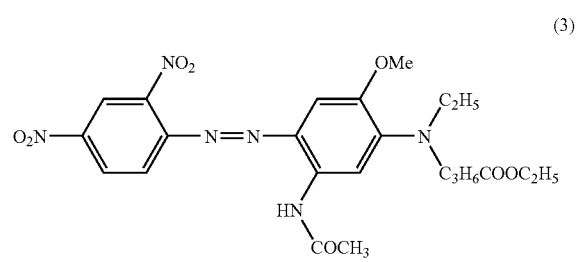

was filtered off, washed and dried.

1.0 g of a monoazo dye of formula (3) thus obtainted and 2.0 g of a naphthalene sulfonic acid-formaldehyde condensate were added to 20 ml of water and milled in a sand mill until the average particular size of dye is reduced to 0.5–3 μm, before dilution to 1000 ml with water. 100 ml of a milled liquid dye thus obtained and 10 g of polyester cloth were introduced into the dye bath adjusted pH 4.5 by acetic acid and sodium acetate in 200 ml of water at room temperature, and the temperature was then raised to 135° C. and maintained for 30 min. in a pressurised dyeing machine. After rinsing and drying the cloth was dyed greenish navy shade of very good fastness to washing, light and sublimation.

COMPARATIVE EXAMPLE 1

Following dye of formula (5) described in example 34 of Japanese patent 58038754;

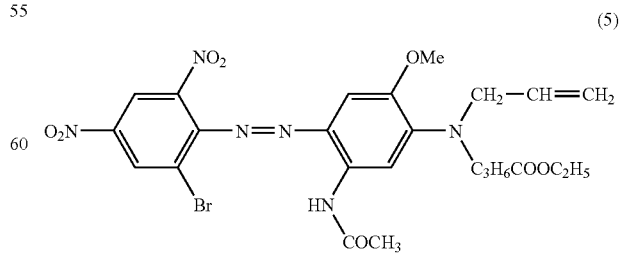

was milled and dyed as described in example 1.

COMPARATIVE EXAMPLE 2

Following dye of formula (6) described in example (k) of Japanese patent 51150530;

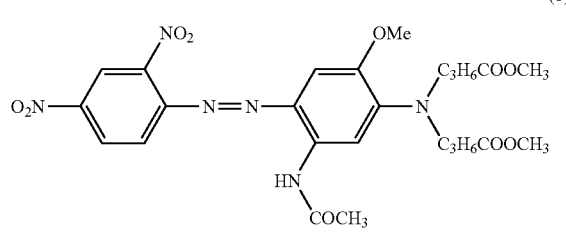

(6)

was milled and dyed as described in example 1.

The results of the comparative dyeings are given in table 1:

TABLE 1

|  | (1)Levelling (patchy dyeing test) | (2)Tinctorial strength | (3)pH stability |
|---|---|---|---|
| Example 1 | 3 | 100 | 100 |
| Comparative Example 1 | 1 | 85 | 100 |
| Comparative Example 2 | 3 | 85 | 60 |

The testing methods used are as follows:

Levelling (Patchy Dyeing Test)

10 ml of a milled liquid dye thus obtained and 10 g of polyester taffeta covering casing holder with small hole were introduced into the dye bath adjusted pH 4.5 by acetic acid and sodium acetate in 300 ml of water at room temperature, and the temperature was rapidly raised to 120° C. with a raising speed of 4° C. per minute and immediately cooled down from 120° C. to 90° C. without maintaining 120° C. for a moment in a pressurised dyeing machine (Pretema multicolor dyeing machine). After finishing dyeing, the polyester taffeta is rinsed and dried.

The casing spot so-called patchy dyeing was judged from the state of levelling of the dyed taffeta to that part where the substrate was inscribed by a substrate holder and expressed according to the following five rank: 5th grade (excellent)-1st grade (poor).

(2) Tinctorial Strength

The polyester cloth dyed according to the method given in example 1 is measured in K/S value of Kubelka-Munk method.

(3) pH Stability

The polyester cloth dyed according to the method given in example 1 is compared to a polyester cloth dyed according to the same method as described in example 1, but at different in pH. The value is described as the following formula: 100 is excellent.

$$\frac{\text{Dyeing strength at } PH\ 8.5}{\text{Dyeing strength at } PH\ 4.5} \times 100 = \text{value of pH stability}$$

The monoazo dye of this present invention, example 1, shows significantly improved properties in levelling property, tinctorial strength and pH stability.

EXAMPLE 2

If 2-Methoxy-5-acetylamino-N-γ-ethoxycarbonylpropyl-N-ethylaniline used in example 1 is replaced by of 2-Methoxy-5-acetylamino-N-acetyloxypropyl-N-ethylaniline, the dye obtained has the formula (4):

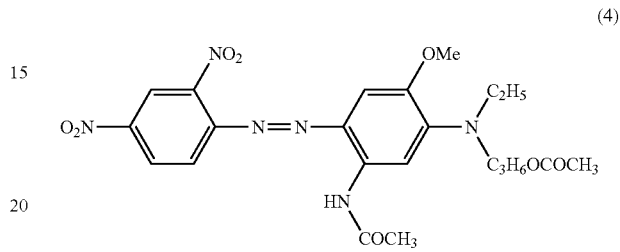

(4)

The monoazo dye thus obtained was milled and dyed as given in example 1. The cloth was dyed greenish navy shade of very good fastness to light, washing and sublimation.

Further inventive dyestuffs applied to polyester under the exhaust dyeing conditions described in Examples 1 and 2 are given in table 2. Again after the normal clearing treatments, the dyeings obtained were navy greenish in shade and gave excellent light fastness. All the dyestuffs exhibited good leveling/migration performance during the dyeing process

TABLE (2)

| Example | $R^1$ | $R^2$ | $R^3$ | n | Shade | $\lambda_{max}$ (nm) in acetone | Light fastness |
|---|---|---|---|---|---|---|---|
| 3 | $CH_3$ | $COOC_2H_5$ | $CH_3$ | 3 | Navy | 574 | 5 |
| 4 | $C_2H_5$ | $COOCH_3$ | $CH_3$ | 3 | Greenish navy | 584 | 5 |
| 5 | $C_2H_5$ | $COOC_3H_7(n)$ | $CH_3$ | 3 | Greenish navy | 586 | 5 |
| 6 | $C_2H_5$ | $OCOC_2H_5$ | $CH_3$ | 3 | Greenish navy | 584 | 5 |
| 7 | $C_2H_5$ | $COOC_3H_7(n)$ | $CH_3$ | 3 | Greenish navy | 585 | 5 |
| 8 | $C_2H_5$ | $COOC_3H_7(i)$ | $CH_3$ | 3 | Greenish navy | 585 | 5 |
| 9 | $n-C_3H_7$ | $OCOCH_3$ | $C_2H_5$ | 3 | Greenish navy | 585 | 5 |
| 10 | $n-C_4H_9$ | $COOCH_3$ | $CH_3$ | 3 | Greenish navy | 588 | 5 |
| 11 | $C_2H_5$ | $CN$ | $CH_3$ | 3 | Navy | 577 | 5–6 |
| 12 | $C_2H_5$ | $OCOCH_3$ | $CH_3$ | 4 | Greenish navy | 590 | 5 |
| 13 | $i-C_3H_7$ | $COOC_2H_5$ | $CH_3$ | 3 | Greenish Navy | 585 | 5 |
| 14 | $i-C_4H_9$ | $OCOCH_3$ | $CH_3$ | 3 | Greenish Navy | 586 | 5 |
| 15 | $C_4H_9$ | $CN$ | $CH_3$ | 4 | Green navy | 580 | 5 |
| 16 | $C_3H_5$ | $CN$ | $C_2H_5$ | 3 | Navy | 577 | 5–6 |
| 17 | $H$ | $COOC_2H_5$ | $CH_3$ | 3 | Navy | 570 | 5–6 |
| 18 | $C_2H_5$ | $H$ | $CH_3$ | 0 | Navy | 573 | 5–6 |

Additionally the test results on fastness properties of the dyed cloths with dyestuff of examples 1 and 2 are summarized in Table 3 as well as their levelling property, in comparison comparing to the results of dyeings with C.I. Disperse Blue 291.1 which is widely applied to navy shade and contains a halogen substituent.

The fastness to washing was determined according to the AATCC 61 2A method.

CA: stain to acetate in multifibre
PA: stain to polyamide in multifibre

The degree of stain was described according to the grey scale for colour staining.

The fastness to light was determined in accordance with ISO 105-B02. The degree of colour fading was described according to the blue scale.

The fastness to sublimation was determined in accordance with ISO 105-P01. The degree of stain to polyester adjacent was described according to the grey scale for colour staining.

TABLE 3

|  | Wash fastness CA/PA | Light fastness | Sublimation | Levelling property |
|---|---|---|---|---|
| Example-1 | 4/3 | 5 | 4 | 3 |
| Example-2 | 4/3− | 5 | 4 | 3 |
| C.I. Disperse Blue 291.1 | 4/3 | 4 | 4 | 1–2 |

Both dyestuffs according to the invention showed excellent fastness and levelling property, comparing to the conventional dyestuff C.I. Disperse Blue 291.1.

The invention claimed is:

1. Monoazo dyestuff or mixture of monoazo dyestuffs of the herein below indicated and defined formula (1)

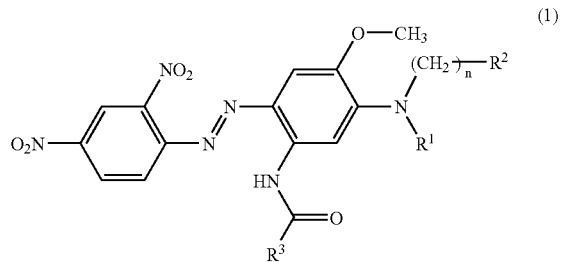

wherein
$R^1$ is $C_1$ to $C_4$-alkyl
$R^2$ is $C_1$ to $C_4$-alkyloxycarbonyl or cyano
$R^3$ is methyl or ethyl
n is 3 or 4.

2. Method for the preparation of monoazo dyestuffs according to claim 1 which comprises diazotizing dinitroaniline followed by a subsequent coupling with an aniline of formula (2):

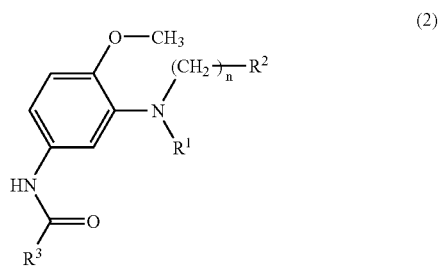

where $R^1$, $R^2$, $R^3$ and n are as defined in claim 1.

3. A dyestuff preparation comprising at least one dyestuff according to claim 1 and at least one dispersing agent, surfactant or wetting agent.

4. A process for coloring a synthetic textile material or fibre blend thereof, which comprises applying thereto a dyestuff or a dyestuff mixture according to claim 1.

5. A process according to claim 4, wherein the synthetic material or fibre blend thereof is a polyester or polyester-cellulose or polyester-wool blend.

6. Monoazo dyestuff or mixture of monoazo dyestuffs according to claim 1,
wherein
$R^1$ is ethyl or n-propyl,
$R^2$ is $C_1$ to $C_2$-alkyloxycerbonyl and
n is 3.

7. Monoazo dyestuff or mixture of nionoazo dyestuffs according to claim 6,
wherein
$R^1$ is ethyl.

8. Monoazo dyestuff or mixture of monoazo dyestuffs according to claim 6,
wherein
$R^1$ is n-propyl.

9. Monoazo dyestuff or mixture of monoazo dyestuffs according to claim 1, wherein $R^2$ is $C_1$ to $C_2$-alkyloxycarbonyl.

* * * * *